United States Patent
Lo (10) Patent No.: US 8,103,640 B2
(45) Date of Patent: Jan. 24, 2012

(54) METHOD AND APPARATUS FOR ROLE MAPPING METHODOLOGY FOR USER REGISTRY MIGRATION

(75) Inventor: Lewis Lo, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1746 days.

(21) Appl. No.: 11/070,591

(22) Filed: Mar. 2, 2005

(65) Prior Publication Data

US 2006/0200504 A1    Sep. 7, 2006

(51) Int. Cl.
G06F 17/00    (2006.01)
G06F 9/44    (2006.01)

(52) U.S. Cl. .................................... 707/694; 717/106

(58) Field of Classification Search .............. 707/9, 100; 705/14; 706/47; 709/206, 226, 229, 232, 709/246; 711/112, 162; 713/182; 714/35; 719/315, 328; 726/1, 26
See application file for complete search history.

(56) References Cited

U.S. PATENT DOCUMENTS

| | | | | |
|---|---|---|---|---|
| 5,978,836 A * | 11/1999 | Ouchi | ........................ | 709/206 |
| 5,999,978 A * | 12/1999 | Angal et al. | ................... | 709/229 |
| 6,038,563 A * | 3/2000 | Bapat et al. | ....................... | 707/10 |
| 6,073,242 A * | 6/2000 | Hardy et al. | ....................... | 726/1 |
| 6,085,191 A * | 7/2000 | Fisher et al. | ....................... | 707/9 |
| 6,108,748 A * | 8/2000 | Ofek et al. | ..................... | 711/112 |
| 6,182,212 B1 | 1/2001 | Atkins et al. | ...................... | 713/1 |
| 6,212,511 B1 * | 4/2001 | Fisher et al. | ....................... | 707/1 |
| 6,339,832 B1 * | 1/2002 | Bowman-Amuah | ............ | 714/35 |
| 6,453,353 B1 * | 9/2002 | Win et al. | ..................... | 709/229 |
| 6,519,571 B1 * | 2/2003 | Guheen et al. | .................. | 705/14 |
| 6,598,134 B2 * | 7/2003 | Ofek et al. | ..................... | 711/162 |
| 6,662,357 B1 * | 12/2003 | Bowman-Amuah | .......... | 717/120 |
| 6,768,988 B2 * | 7/2004 | Boreham et al. | ................... | 707/3 |
| 6,772,167 B1 | 8/2004 | Snavely et al. | ............... | 707/102 |
| 6,785,686 B2 | 8/2004 | Boreham et al. | ............. | 707/102 |
| 6,804,718 B1 * | 10/2004 | Pang et al. | ..................... | 709/226 |
| 7,080,159 B2 * | 7/2006 | Chu et al. | ....................... | 709/246 |

(Continued)

OTHER PUBLICATIONS

Rana et al., "What is Scalability in Multi-Agent Systems?" ACM Digital Library, 2000.

(Continued)

*Primary Examiner* — Tarek Chbouki (74) *Attorney, Agent, or Firm* — Yee & Associates, P.C.; Jeffrey S. LaBaw (57) ABSTRACT

A method, an apparatus, and computer instructions are provided for role mapping methodology for user registry migration. A migration engine is provided, which conjoins a set of conditions defined in a role mapping file to form a set of migration rules. The migration engine evaluates the migration rules against the current role of each user in the user registry and determines if the user should be assigned a new role. If a new role is assigned, the migration engine updates the user registry with the new role.

28 Claims, 5 Drawing Sheets

U.S. PATENT DOCUMENTS

| | | | |
|---|---|---|---|
| 2002/0010808 A1* | 1/2002 | Wiggins et al. | 709/328 |
| 2003/0046270 A1* | 3/2003 | Leung et al. | 707/1 |
| 2003/0050929 A1* | 3/2003 | Bookman et al. | 707/7 |
| 2003/0074386 A1* | 4/2003 | Schmidt et al. | 709/1 |
| 2003/0177146 A1* | 9/2003 | Zimowski | 707/200 |
| 2003/0191752 A1* | 10/2003 | Fairweather | 707/3 |
| 2003/0200459 A1* | 10/2003 | Seeman | 713/200 |
| 2003/0229605 A1* | 12/2003 | Herrera et al. | 706/47 |
| 2004/0098594 A1* | 5/2004 | Fleming et al. | 713/182 |
| 2004/0205039 A1* | 10/2004 | Bittner et al. | 706/47 |
| 2005/0015775 A1* | 1/2005 | Russell et al. | 719/315 |
| 2005/0044197 A1* | 2/2005 | Lai | 709/223 |
| 2005/0165817 A1* | 7/2005 | O'Conor | 707/101 |
| 2005/0223109 A1* | 10/2005 | Mamou et al. | 709/232 |
| 2005/0257245 A1* | 11/2005 | Patrick et al. | 726/1 |
| 2005/0262362 A1* | 11/2005 | Patrick et al. | 713/193 |
| 2006/0015527 A1* | 1/2006 | Dingle | 707/103 X |
| 2006/0101073 A1* | 5/2006 | Popa et al. | 707/104.1 |

OTHER PUBLICATIONS

Welch et al. "Domain-Driven Reconfiguration in Collaborative Virtual Environments", 1997 IEEE, AN-5738641, pp. 167-172.

* cited by examiner

```
                                603                            604
                                  \                              /        ,600
    <roleMapping>                   \                             /      /
        ┌  <newRole name='TCdcmOperator' dn='cn=TCdcmOperator' mode='any'>
        │      <currentRole>cn=TCrmLock</currentRole> ⌒ 608
        │      <currentRole>cn=TCrmCheckLock</currentRole> ⌒ 610
        │      <currentRole>cn=TCrmUnlock</currentRole> ⌒ 612
    602 ┤      <currentRole>cn=TCdcmCredentialsQueryInteraction</currentRole> ⌒ 614
        │      <currentRole>cn=TCdcmCredentialsChangeInteraction</currentRole> ⌒ 616
        │      <currentRole>cn=TCdcmSoftwareInteraction</currentRole> ⌒ 618
        └  </newRole>   603 ⌒
        ┌  <newRole name='TCdcmOperator' dn='cn=TCdcmOperator' mode='any'>
        │      <currentRole>cn=TCdcmDeviceInteraction</currentRole> ⌒ 622
    620 ┤      <currentRole>cn=TCdcmBootServerInteraction</currentRole> ⌒ 624
        │      <currentRole>cn=TCdcmPowerUnitInteraction</currentRole> ⌒ 626      632
        └  </newRole>   631 ⌒                                                     /
        ┌  <newRole name='TCMonitorAndAdvisor' dn='cn=TCMonitorAndAdvisor' mode='all'>
        │      <currentRole>cn=TCdcmRouterInteraction</currentRole> ⌒ 634
        │      <currentRole>cn=TCdcmSwitchFabricInteraction</currentRole> ⌒ 636
    630 ┤      <currentRole>cn=TCdcmSwitchInteraction</currentRole> ⌒ 638
        │      <currentRole>cn=TCdcmServiceAccessPointInteraction</currentRole> ⌒ 640
        │      <currentRole>cn=TCdcmFirewallInteraction</currentRole> ⌒ 642      652
        └  </newRole>   631 ⌒                                                     /
        ┌  <newRole name='TCMonitorAndAdvisor' dn='cn=TCMonitorAndAdvisor' mode='any'>
    650 ┤      <currentRole>cn=TCrecommendationChange</currentRole> ⌒ 654
        │      <currentRole>cn=TCfaultmanagement</currentRole> ⌒ 656              662
        └  </newRole>   631 ⌒                                                     /
        ┌  <newRole name='TCMonitorAndAdvisor' dn='cn=TCMonitorAndAdvisor' mode='all'>
        │      <currentRole>cn=TCcontrollerOperatingModeQuery</currentRole> ⌒ 664
    660 ┤      <currentRole>cn=TCcontrollerOperatingModeChange</currentRole> ⌒ 666
        │      <currentRole>cn=TCdcmCredentialsQueryInteraction</currentRole> ⌒ 668
        │      <currentRole>cn=TCdcmCredentialsChangeInteraction</currentRole> ⌒ 670
        └  </newRole>
    </roleMapping>
```

METHOD AND APPARATUS FOR ROLE MAPPING METHODOLOGY FOR USER REGISTRY MIGRATION

BACKGROUND OF THE INVENTION

1. Technical Field

The present invention relates to an improved data center. In particular, the present invention relates to deploying software applications in a data center. Still more particularly, the present invention relates to providing alternative installation structures for deployment of software applications in a data center.

2. Description of Related Art

In most application servers, a user registry is included to provide security functions, such as authentication of usernames and passwords for resource access. The user registry may be local operating system-based or Lightweight Directory Access Protocol (LDAP)-based. LDAP-based registries, such as Virtuoso or BACH, assign one or more roles to each user in the registry, such that the user may access one or more resources based on the assigned role. Virtuoso and BACH are products available from International Business Machines Corporation.

However, when a user registry is migrated from one registry to another, each registry may have different limits of the number of roles allowed for each user. For example, in Virtuoso, a user may be assigned up to 30 roles, while, in BACH, a user may be assigned only up to 5 roles. In this case, a need exists for a mechanism that scales down the number of roles per user in order to meet the limit imposed by different user registries.

Currently, existing migration techniques require administrators to manually determine migration rules for each user. In addition, the administrators have to migrate the user one by one based on the migration rules from one user registry to another. These techniques are error prone and time-consuming, because human error may be introduced during migration and applying migration rules manually requires a significant amount of time and effort by the administrators.

Therefore, it would be advantageous to have a method, an apparatus, and computer instructions for a role mapping methodology for user registry migration, such that the number of roles for each user may be adjusted accordingly when migrating roles from one user registry to another.

SUMMARY OF THE INVENTION

The present invention provides a method, an apparatus, and computer instructions for mapping user roles for a user registry migration. The present invention detects a role mapping file comprising a set of rules, wherein each rule defines a set of conditions for assigning a new role. The present invention then conjoins the set of conditions to form a set of migration rules, retrieves a current role of at least one user from a list of users in a user registry, and applies at least one migration rule from the set to the current role of the at least one user.

In addition, the present invention determines whether the current role of the at least one user satisfies the at least one migration rule, assigns the new role to the at least one user if the current role of the user satisfies the at least one migration rule, and updates the user registry with the new role for the at least one user.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 is a diagram illustrating an exemplary role mapping file, in accordance with a preferred embodiment of the present invention;

DETAILED DESCRIPTION OF THE PREFERRED EMBODIMENT

Figure 1:
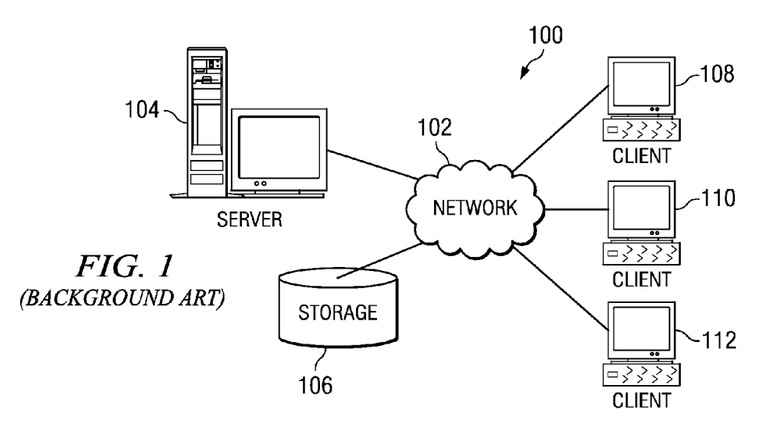
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
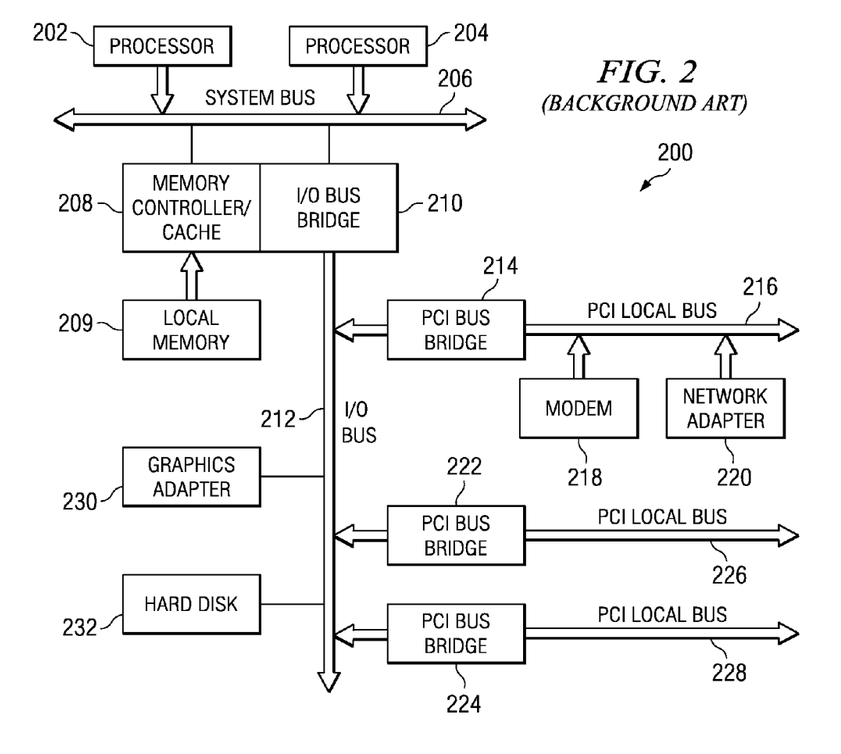
FIG. 2 is a block diagram of a data processing system that may be implemented as a server, in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMC) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
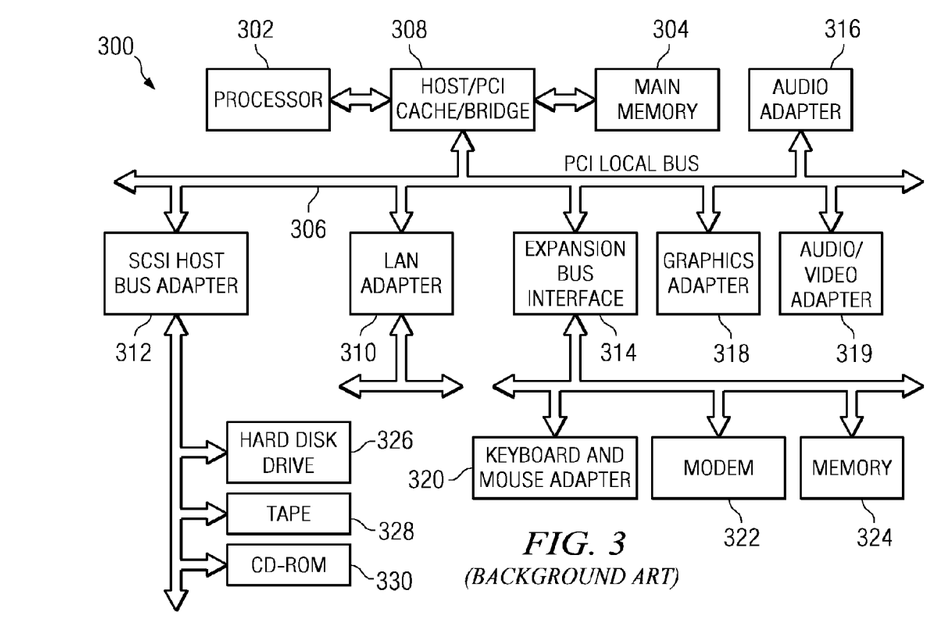
FIG. 3 is a block diagram of a data processing system in which a preferred embodiment of the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Microsoft® Windows XP™, (Microsoft and Windows XP are trademarks of Microsoft Corporation in the United States, other countries, or both). An object oriented programming system, such as the Java™ programming system, may run in conjunction with the operating system and provide calls to the operating system from Java™ programs or applications executing on data processing system 300. Java™ and all Java™-based trademarks are trademarks of Sun Microsystems, Inc. in the United States, other countries, or both. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and computer instructions for a user role mapping methodology for user registry migration. In a preferred embodiment, the present invention provides a migration engine, which uses set theory for migrating user roles from one user registry to another.

The migration engine takes a role mapping file as an input. The role mapping file may be formatted in a markup language, such as extensible markup language (XML), and may be defined by an end user. Within the role mapping file, a set of rules may be defined with each rule having a set of conditions. Each condition may include a set of roles.

A condition may be defined as an 'ANY' or 'ALL', meaning that the condition is satisfied if the user has any of the roles if 'ANY' is specified or if the user has all of the roles if 'ALL' is specified. In addition, two or more conditions may be joined by an 'AND' operator. The migration engine will only assign a role to the user if all of the conditions defined in a rule are satisfied.

When the migration engine receives the role mapping file as an input, the migration engine evaluates each user in the user registry based the set of defined rules from the role mapping file. For each new role, the evaluation is performed by explicitly conjoining all the conditions for the new role in the role mapping file to formulate a migration rule. The migration engine then traverses an LDAP tree given the suffix of the tree in the user registry. For each user found in the tree, the migration engine retrieves the role information of the user and applies all the migration rules to the user. If the migration rules are satisfied, the migration engine assigns a role to the user and updates the user registry accordingly.

Figure 4:
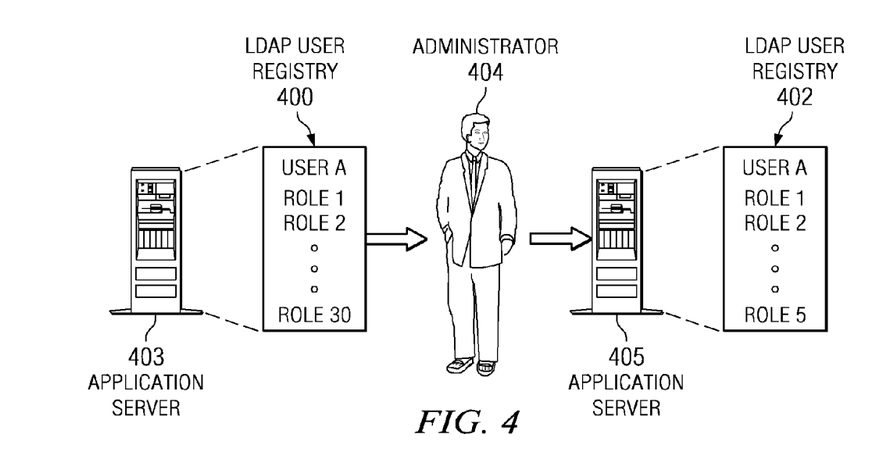
FIG. 4 is a diagram illustrating a known user role mapping for user registry migration.

Turning now to FIG. 4, a diagram illustrating a known user role mapping for user registry migration is depicted. As shown in FIG. 4, LDAP user registry 400 residing on application server 403 includes an entry for user A. Application server 403 may be implemented as a server, such as data processing system 200 in FIG. 2. The entry for user A maps user A to 30 different roles, from Role 1 to Role 30.

In order to migrate LDAP user registry 400 to a different user registry, such as LDAP user registry 402 residing on application server 405, administrator 404 manually re-assigns roles to user A, based on a set of defined rules. The set of defined rules includes conditions defined for each user role. In this example, administrator 404 re-assigns 5 different roles to user A based on the set of defined rules, from Role 1 to Role 5.

Thus, with the known user role mapping, the administrator has to manually assign roles to each user based on a set of rules associated with each role. This assignment is a tedious and time-consuming task considering the number of roles each user may have and the number of rules associated with each role.

Figure 5:
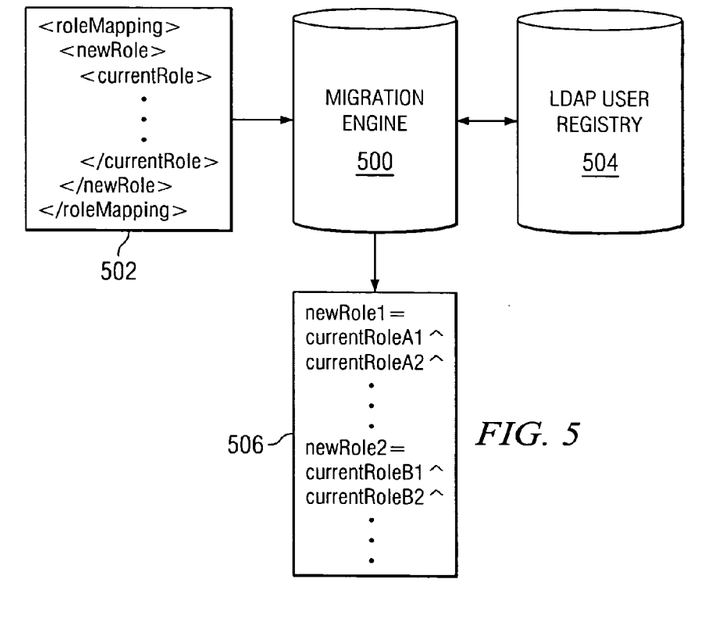
FIG. 5 is a diagram illustrating a user role mapping methodology for user registry migration, in accordance with a preferred embodiment of the present invention.

Turning now to FIG. 5, a diagram illustrating a user role mapping methodology for user registry migration is depicted in accordance with a preferred embodiment of the present invention. As shown in FIG. 5, migration engine 500 takes role mapping file 502 as input. Role mapping file 502 may be formatted in a markup language format, such as XML.

In role mapping file 502, a set of rules are included with each rule having a set of conditions. Each condition includes a set of roles and may be defined as 'ANY' or 'ALL' on the set of roles. If 'ANY' is specified for a condition, the user has to satisfy only one of the roles in order to be assigned a new role in the new registry. If 'ALL' is specified for a condition, the user has to satisfy all of the roles in order to be assigned a new role in the new registry.

Migration engine 500 then uses set theory to conjoin the conditions defined for each new role in role mapping file 502 to generate a migration rule 506 for that role. The use of set theory is explained in more detail in FIG. 7. The migration rule 506 includes expressions for evaluating the conditions necessary for assigning the new role. Once the set of migration rules 506 is generated, migration engine 500 traverses an LDAP tree given a suffix of the tree in LDAP user registry 504. For each user found in the tree, migration engine 500 retrieves role information of the user and applies the set of migration rules 506 to the user. If all the rules are satisfied, migration engine 500 assigns a new role to the user and updates LDAP user registry 504 to reflect the new role assigned.

Turning now to FIG. 6, a diagram illustrating an exemplary role mapping file is depicted in accordance with a preferred embodiment of the present invention. In this illustrative example, role mapping file 600 includes 5 conditions: conditions 602, 620, 630, 650, and 660.

Each condition defines a new role to which the user is assigned if all the rules are satisfied. Two or more conditions may be joined to formulate rules for a new role. For example, conditions 602 and 620 are joined to define a new role TCdcmOperator 603, while conditions 630, 650 and 660 are joined to define a new role TCMonitorAndAdvisor 631.

In addition, each condition specifies a mode of either 'ANY' or 'ALL'. In one example, condition 602 includes a mode of 'ANY' 604. Thus, if a user's current role is one of TCrmLock 608, TCrmCheckLock 610, TCrmUnlock 612, TCdcmCredentialsQueryInteraction 614, TCdcmCredentialsChangeInteraction 616, and TCdcmSoftwareInteraction 618, condition 602 is satisfied. Similarly, condition 620 is satisfied if the user's current role is one of TcdcmDeviceInteraction 622, TCdcmBootServerInteraction 624, and TCdcmPowerUnitInteraction 626. If conditions 602 and 620 are both satisfied, the user is assigned new role TCdcmOperator 603.

In another example, condition 630 specifies a mode of 'ALL' 632. Thus, if a user's current role has all of TCdcmRouterInteraction 634, TCdcmSwitchFabricInteraction 636, TCdcmSwitchInteraction 638, TCdcmServiceAccessPointInteraction 640, and TCdcmFirewallInteraction 642, condition 630 is satisfied. Similarly, condition 660 is satisfied if the user's current role has all 662 of TCcontrollerOperatingModeQuery 664, TCcontrollerOperatingModeChange 666, TCdcmCredentialsQueryInteraction 668, and TCdmCredentialsChangeInteraction 670.

In addition to satisfying conditions 630 and 660, condition of 650 also needs to be satisfied before the user can be assigned new role TCMonitorAndAdvisor 631. Condition 650 specifies a mode of 'ANY' 652. Thus, if a user's current role is one of TCrecommendationChange 654 and TCfaultmanagement 656, condition 650 is satisfied.

Figure 7:
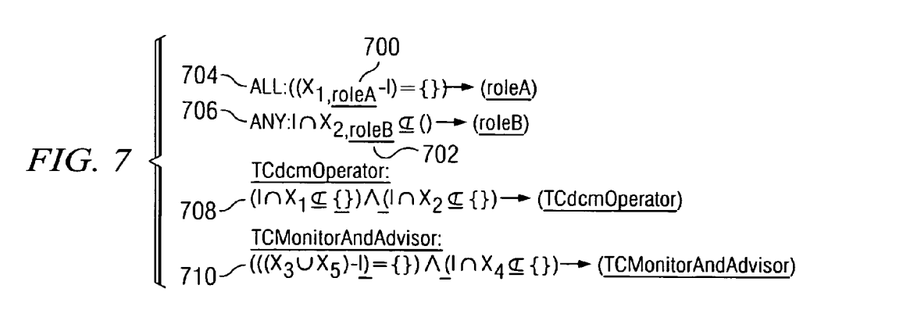
FIG. 7 is a diagram illustrating expressions generated by the migration engine as a result of applying set theory, in accordance with a preferred embodiment of the present invention.

When generating a set of migration rules based on the conditions defined in the role mapping file, the migration engine employs a set theory to construct an expression. Turning now to FIG. 7, a diagram illustrating expressions generated by the migration engine as a result of applying set theory is depicted in accordance with a preferred embodiment of the present invention. Set theory is a mathematical theory of sets, which represent a collection of abstract objects.

The migration engine generates a set of migration rules based on conditions that include 'ANY' or 'ALL' constraints. For example, the set of migration rules is expressed in expressions 704 and 706. As shown in FIG. 7, $X_{1, roleA}$ 700 is a 'ALL' constraint, which specifies a list of roles the user must have in order to migrate to roleA. $X_{2, roleB}$ 702 is a 'ANY' constraint. If a user has any one of the roles specified in $X_{2, roleB}$ 702, the user may be assigned roleB. I is a set of roles the user currently has in the user registry.

Expression 704 is an 'ALL' expression that evaluates if $X_{1, roleA}$ 700 minus I is equal to an empty set { }. This expression means that if the set of current roles includes the set of roles a user must have, the user is assigned to roleA. For example, if the set of roles for roleA includes roles a, b, and c, a user may still be assigned roleA if the set of current roles includes roles a, b, c, d, e, and f, because the user has role a, b, and c in his current roles.

Expression 706 is an 'ANY' expression that evaluates if the set of current roles intersects with $X_{2, roleB}$ 702 is not a subset of an empty set. Intersection is similar to an OR operation. Thus, expression 706 assigns the user to roleB if the set of current roles is any of the set of roles specified.

Referring back to FIG. 6, assuming condition 602 is $X_1$, condition 620 is $X_2$, condition 630 is $X_3$, condition 650 is $X_4$, and condition 660 is $X_5$, a migration rule may be generated by the migration engine for assigning new role TCdcmOperator 603. The migration rule is embodied in expression 708 in FIG. 7.

Expression 708 includes two parts. The first part is similar to expression 706, which evaluates the 'ANY' condition 602 by determining if expression 'I intersects with $X_1$, is not a subset of an empty set. The second part evaluates the 'ANY' condition 620 by determining if expression 'I intersects with $X_2$' is not a subset of an empty set. The two parts are then joined together using an 'AND' operator. If both parts evaluate to a true, the user is assigned TCdcmOperator. If any one part fails, the user will not be assigned TCdcmOperator 603.

On the other hand, a migration rule may be generated by the migration engine for assigning new role TCMonitorAndAdvisor 631. The migration rule is embodied in expression 710 in FIG. 7. Expression 710 also includes two parts. The first part is similar to expression 704, which evaluates the 'ALL' condition 630 and 660 by determining if $X_3$ minus I and $X_5$ minus I is equal to an empty set { }. The second part is similar to expression 706, which evaluates the 'ANY' condition 650 by determining if expression 'I intersects with $X_4$' is not a subset of an empty set. If both parts evaluate to a true, the user is assigned TCMonitorAndAdvisor. If any one part fails, the user will not be assigned TCMonitorAndAdvisor.

Figure 8:
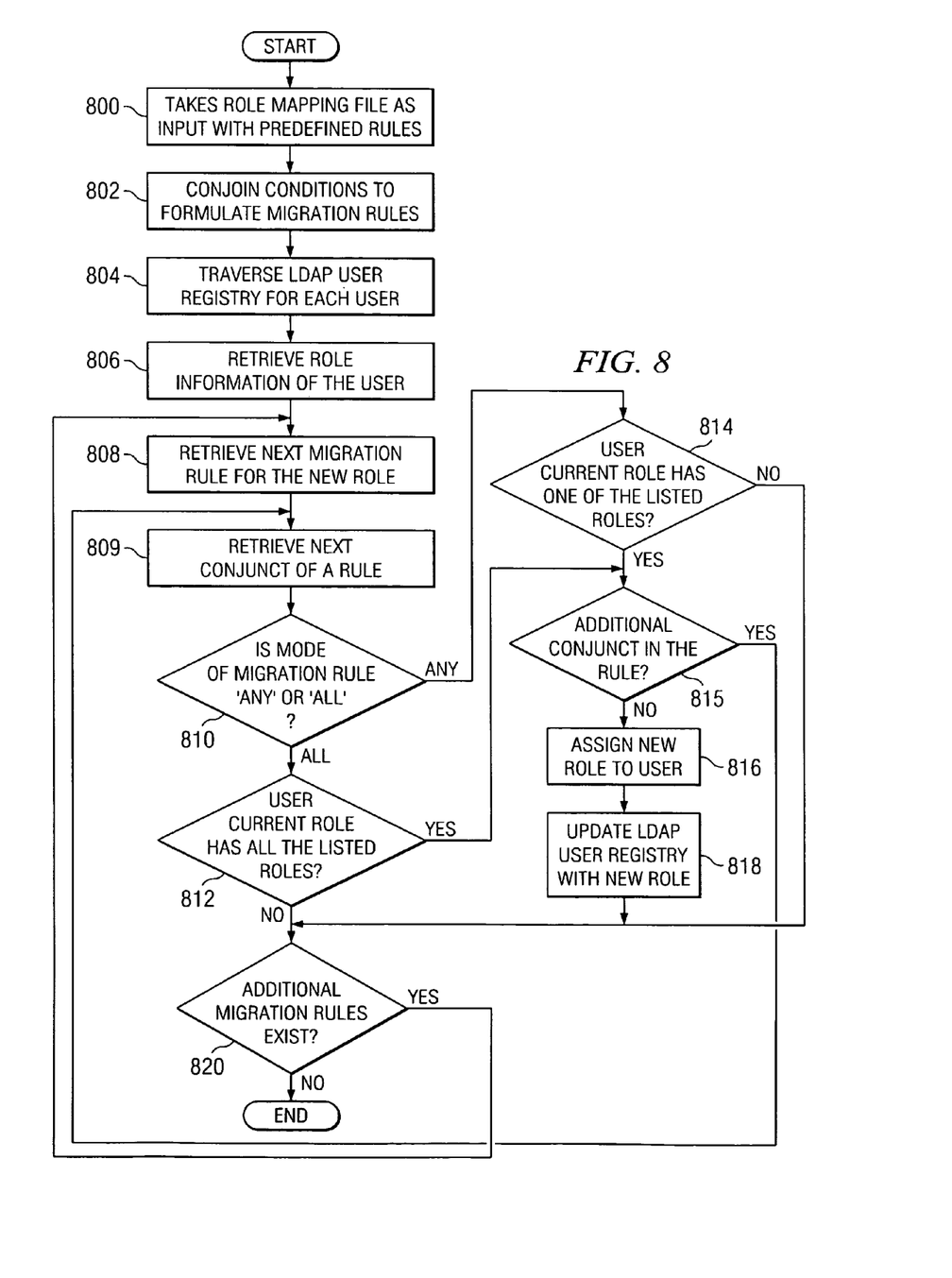
FIG. 8 is a flowchart of an exemplary process for user role mapping for user registry migration in accordance with a preferred embodiment of the present invention.

Turning now to FIG. 8, a flowchart of an exemplary process for user role mapping methodology for user registry migration is depicted in accordance with a preferred embodiment of the present invention. As shown in FIG. 8, the process begins when the migration engine of the present invention takes the role mapping file as an input with predefined rules (step 800). The rules are typically defined by an end user and the role mapping file is formatted in a markup language format.

Next, the migration engine conjoins the conditions specified in the role mapping file to formulate a set of migration rules (step 802). The migration engine uses set theory to generate expressions for evaluating the conditions necessary for assigning the new role. After the rules are formulated, the migration engine traverses the LDAP user registry tree given the suffix of the tree for each user (step 804). Then, the migration engine retrieves the role information of each user (step 806) and retrieves the next migration rule for the new role (step 808). Once the next migration rule is retrieved, the migration engine retrieves the next conjunct of the migration rule (step 809).

A determination is made by the migration engine as to whether the mode of the migration rule is a 'ANY' condition or 'ALL' condition (step 810). If the condition is 'ALL', the migration engine determines if the user's current role has all listed role in the condition (step 812) and the process continues to step 815. If the condition is 'ANY', the migration engine then determines if the user's current role has one of the listed roles in the condition (step 814) and the process continues to step 815. Turning back to steps 812 and 814, if the user has neither one of the listed roles nor all of the listed roles, the process continues to step 820.

At step 815, a determination is made by the migration engine as to whether an additional conjunct is present in the migration rule. If an additional conjunct is present, the process returns to step 809 to retrieve the next conjunct of the migration rule. If no additional conjunct is present, the migration engine assigns the new role to the user (step 816), since the conditions in steps 812 and 814 are satisfied. The migration engine then updates the LDAP user registry accordingly with the newly assigned role (step 818). At step 820, the migration engine makes a determination as to whether additional migration rules are present. If additional migration rules are present, the process returns to step 808 to retrieve the next migration rule for the new role. Otherwise, the process terminates thereafter.

Thus, the present invention provides advantage over the prior art in that an end user may define as many conditions as needed in terms of the set of roles using the migration engine in order to formulate a set of rules for migrating roles from one registry to another. In this way, new roles may be assigned to the entries of the new registry for the user to satisfy the rules.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method performed in a data processing system for mapping user roles for a user registry migration, the method comprising:

detecting a role mapping file comprising a set of rules, wherein each rule defines a set of conditions for assigning a new role;

conjoining the set of conditions to form a set of migration rules for the new role;

retrieving a current role of at least one user from a list of users in a user registry;

applying at least one migration rule from the set of migration rules to the current role of the at least one user;

determining if the current role of the at least one user satisfies the at least one migration rule;

assigning the new role to the at least one user if the current role of the at least one user satisfies the at least one migration rule; and updating the user registry with the new role for the at least one user.

2. The method of claim 1, wherein each rule of the set of rules defines a user role to which a user is assigned if all conditions in the set of conditions are satisfied.

3. The method of claim 1, wherein the role mapping file is formatted in a markup language format.

4. The method of claim 1, wherein the set of rules is defined by an end user.

5. The method of claim 1, wherein the set of conditions includes a set of roles, a new role name, and a mode.

6. The method of claim 5, wherein the mode includes one of ANY and ALL mode.

7. The method of claim 1, wherein the conjoining step comprises:

generating an expression using set theory for an ANY condition in the set of conditions, wherein the expression evaluates if the current role is any of a set of roles specified in the ANY condition.

8. The method of claim 1, wherein the conjoining step comprises:
    generating an expression using set theory for an ALL condition in the set of conditions, wherein the expression evaluates if the current role includes a set of roles specified in the ALL condition.

9. The method of claim 1, wherein the conjoining step includes joining two or more conditions in the set with an AND operator to form a migration rule.

10. The method of claim 7, wherein the determining step comprises:
    determining that the at least one migration rule is satisfied if the current role is any of a set of roles specified in the ANY condition.

11. The method of claim 1, wherein the determining step comprises:
    determining that the at least one migration rule is satisfied if the current role includes a set of roles specified in the ALL condition.

12. The method of claim 1, further comprising:
    repeating the applying, determining, assigning, and updating steps until all migration rules in the set of migration rules are applied.

13. A data processing system for mapping user roles for a user registry migration, the data processing system comprising:
    a processor;
    a memory connected to the processor via a processor bus;
    wherein the processor is adapted to execute computer implemented instructions to detect a role mapping file comprising a set of rules, wherein each rule defines a set of conditions for assigning a new role;
    conjoin the set of conditions to form a set of migration rules for the new role;
    retrieve a current role of at least one user from a list of users in a user registry;
    apply at least one migration rule from the set to the current role of the at least one user;
    determine if the current role of the at least one user satisfies the at least one migration rule;
    assign the new role to the at least one user if the current role of the at least one user satisfies the at least one migration rule; and
    update the user registry with the new role for the at least one user.

14. The data processing system of claim 13, wherein each rule of the set of rules defines a user role to which a user is assigned if all conditions in the set of conditions are satisfied.

15. The data processing system of claim 13, wherein the processor is further adapted to execute computer implemented instructions to conjoin the set of conditions by generating an expression using set theory for an ANY condition in the set of conditions, wherein the expression evaluates if the current role is any of a set of roles specified in the ANY condition.

16. The data processing system of claim 13, wherein the processor is adapted to execute computer implemented instructions to conjoin the set of conditions by generating an expression using set theory for an ALL condition in the set of conditions, wherein the expression evaluates if the current role includes a set of roles specified in the ALL condition.

17. The data processing system of claim 13, wherein the processor is adapted to execute computer implemented instructions to conjoin the set of conditions by joining two or more conditions in the set with an AND operator to form a migration rule.

18. The data processing system of claim 15, wherein the processor is adapted to execute computer implemented instructions to determine that the at least one migration rule is satisfied if the current role is any of a set of roles specified in the ANY condition.

19. The data processing system of claim 16, wherein the processor is adapted to execute computer implemented instructions to determine if the current role of the at least one user satisfies the at least one migration rule by determining that the at least one migration rule is satisfied if the current role includes a set of roles specified in the ALL condition.

20. The data processing system of claim 13, wherein the processor is adapted to execute computer implemented instructions to repeat the applying, determining, assigning, and updating steps until all migration rules in the set of migration rules are applied.

21. A non-transitory computer readable storage medium, with an executable program stored therein configured to map user role for a user registry migration, wherein executable instructions further comprises:
    first instructions for detecting a role mapping file comprising a set of rules, wherein each rule defines a set of conditions for assigning a new role;
    second instructions for conjoining the set of conditions to form a set of migration rules for the new role;
    third instructions for retrieving a current role of at least one user from a list of users in a user registry;
    fourth instructions for applying at least one migration rule from the set to the current role of the at least one user;
    fifth instructions for determining if the current role of the at least one user satisfies the at least one migration rule;
    sixth instructions for assigning the new role to the at least one user if the current role of the at least one user satisfies the at least one migration rule; and
    seventh instructions for updating the user registry with the new role for the at least one user.

22. The computer readable storage medium of claim 21, wherein each rule of the set of rules defines a user role to which a user is assigned if all conditions in the set of conditions are satisfied.

23. The computer readable storage medium of claim 21, wherein the second instructions comprises:
    first sub-instructions for generating an expression using set theory for an ANY condition in the set of conditions, wherein the expression evaluates if the current role is any of a set of roles specified in the ANY condition.

24. The computer readable storage medium claim 21, wherein the second instructions comprises:
    first sub-instructions for generating an expression using set theory for an ALL condition in the set of conditions, wherein the expression evaluates if the current role includes a set of roles specified in the ALL condition.

25. The computer readable storage medium claim 21, wherein the second instructions includes first sub-instructions for joining two or more conditions in the set with an AND operator to form a migration rule.

26. The computer readable storage medium claim 23, wherein the fifth instructions comprises:
    first sub-instructions for determining that the at least one migration rule is satisfied if the current role is any of a set of roles specified in the ANY condition.

27. The computer readable storage medium of claim 24, wherein the fifth instructions comprises:
   first sub-instructions for determining that the at least one migration rule is satisfied if the current role includes a set of roles specified in the ALL condition.

28. The computer readable storage medium of claim 21, further comprising:

eighth instructions for repeating the applying, determining, assigning, and updating means until all migration rules in the set of migration rules are applied.

\* \* \* \* \*